(12) United States Patent
Welch, Jr.

(10) Patent No.: US 7,553,258 B2
(45) Date of Patent: Jun. 30, 2009

(54) EXCAVATION MACHINE WITH CONSTANT POWER OUTPUT CONTROL FOR TORQUE-CONVERTER DRIVEN WORKING ELEMENT

(75) Inventor: Johnnie C. Welch, Jr., Arlington, TX (US)

(73) Assignee: Tesmec USA, Inc., Alvarado, TX (US)

( * ) Notice: Subject to any disclaimer, the term of this patent is extended or adjusted under 35 U.S.C. 154(b) by 437 days.

(21) Appl. No.: 11/550,299

(22) Filed: Oct. 17, 2006

(65) Prior Publication Data

US 2008/0090699 A1    Apr. 17, 2008

(51) Int. Cl.
  *B60W 10/04*  (2006.01)
  *B60W 10/30*  (2006.01)
(52) U.S. Cl. ........................................ 477/115
(58) Field of Classification Search ............... 477/186
  See application file for complete search history.

(56) References Cited

U.S. PATENT DOCUMENTS

| | | | |
|---|---|---|---|
| 3,979,915 A | 9/1976 | Kronogard | |
| 4,344,499 A * | 8/1982 | van der Lely et al. | 180/197 |
| 4,794,807 A * | 1/1989 | Horii et al. | 74/15.84 |
| 5,295,353 A | 3/1994 | Ikari | |
| 5,457,633 A * | 10/1995 | Palmer et al. | 701/112 |
| 5,469,646 A | 11/1995 | Takamura | |
| 5,509,220 A | 4/1996 | Cooper | |
| 5,989,154 A * | 11/1999 | Christensen et al. | 477/111 |
| 6,014,996 A | 1/2000 | Egging et al. | |
| 6,205,385 B1 | 3/2001 | Stelzle et al. | |
| 6,208,925 B1 * | 3/2001 | Creger et al. | 701/51 |
| 6,234,254 B1 * | 5/2001 | Dietz et al. | 172/3 |
| 6,427,107 B1 | 7/2002 | Chiu et al. | |
| 6,553,302 B2 | 4/2003 | Goodnight et al. | |
| 6,658,767 B2 | 12/2003 | Kelly et al. | |
| 6,658,768 B1 | 12/2003 | Bainter | |
| 7,020,553 B2 | 3/2006 | Nakamura et al. | |
| 2006/0059730 A1 | 3/2006 | Parker | |
| 2007/0078041 A1 * | 4/2007 | Nishi et al. | 477/115 |
| 2008/0072997 A1 * | 3/2008 | Thompson | 144/4.1 |

* cited by examiner

*Primary Examiner*—Sherry Estremsky
(74) *Attorney, Agent, or Firm*—Gardere Wynne Sewell LLP

(57) ABSTRACT

A controller for crawlers of a trencher receives an indication of the speed of an engine and the speed of an output of a torque converter coupling the engine to an excavating element for digging a trench. Based on the ratio of the speed of the engine and the speed of the output of the torque converter, the controller overrides operator input on the crawlers and stops or slows the trencher when the ratio exceeds a predetermined ranged.

13 Claims, 5 Drawing Sheets

EXCAVATION MACHINE WITH CONSTANT POWER OUTPUT CONTROL FOR TORQUE-CONVERTER DRIVEN WORKING ELEMENT

BACKGROUND OF THE INVENTION

Trenchers, which are a type of earth excavating machine, come in four basic types: bucket wheel, chain, drum and disk or saw. FIG. 1 illustrates a typical chain type trencher 100, which is intended to represent generally this class of large, powerful machines used for digging deep and/or long trenches. Trenchers of this type are based on a tractor with a propulsion system that most often takes the form of a set of caterpillar tracks or crawlers 102, one on each side of the machine. Other types of propulsion systems can, however, be used. The working element is a digging element that is pivotably mounted to the tractor in a manner that permits it to be lowered into the ground. In this example, the digging element includes a continuous chain 104 mounted with a plurality of spaced-apart cutting teeth 106. The chain travels on a track formed on bar 108. The bar is pivotably connected to the tractor. Hydraulic piston actuator 110 causes the bar to pivot, thus moving its tip up or down to adjust the depth of cut. Details of the chain and its pivotal attachment to the tractor are well known. Mounted to the opposite end of the tractor is power plant 112, typically a diesel-fueled internal combustion engine, as in this example. Controls for operating the crawlers and the digging element are placed in operator cabin 114.

FIG. 2 illustrates the drive train for the excavating element e.g. bucket wheel, chain or disk—of trencher 100 of FIG. 1. The output (not visible) of internal engine 202 is coupled to an input (not visible) of torque converter 204. An output of the torque converter is attached to a rotating drive shaft 206. In this example, rotating drive shaft 206 is coupled with the chain 106 through a chain driven transmission. The drive shaft 206 is coupled to transverse gear box 210, which in turn is coupled through reduction gears 216, by chains 212 and 214, to drive sprocket for 218 that rotates the cutting chain 106.

Not shown in FIG. 2 is a hydraulic system for powering the crawlers. An operator controls movement of the trencher by tuning on and off, and changing the direction of flow, of pressurized hydraulic fluid to the crawlers These two power systems—the system for powering the digging element described above and the system for powering the crawlers—are represented generically by the schematic of FIG. 3. FIG. 3 represents a machine having two power systems (with either 1 or 2 engines), one for driving its working element and one for driving a locomotive element. System 302 represents a working element powered by a system with power train that includes torque converter 306 or similar fluid on coupling for transmitting rotation from a power source 308 to a working element that imposes a load 310 on the system. System 304 represents a locomotive element of a machine. It includes a power source 312 and a transmission 314 that transmits the power to a locomotive that moves the machine, which imposes a load 316 on the power source. As system 304 moves the machine, an additional load is induced on system 302. Arrow 318 represents this induced load on system 302. In the example of a trencher, operation of the crawler at a higher pull force speed faster than the excavating element digs the trench induces a substantial additional load on the power system for the excavating element. This additional load slows the speed of the excavating element, and increases the pull force of the excavating element resulting in reasonable constant power being delivered by the engine to the excavating element. The decrease in speed of the excavating element can approach stall if the speed decrease is allowed to continue. Prolonged operation of the engine with the excavating element stalled can also lead to over heating of and damage to the torque converter and engine.

SUMMARY OF THE INVENTION

In a machine that has a first power delivery system for moving the machine and a second system with a torque converter for delivering power to a working element, the invention pertains generally to controlling the first system in response to variations in the load on the second system induced by the first system. In a preferred embodiment, the second system includes a rotational power source coupled with a torque converter. The output speed of the rotational power source and the output speed of the rotational output of the torque converter are measured and one or more feedback parameters—for example a ratio of the two and/or a derivative or integral of the ratio—are generated from those measurements and compared to predetermined criteria. The first system is controlled to maintain the feedback parameters) in an acceptable range, therefore permitting power output from the torque converter to be maintained at a relatively constant level.

In the example of a trencher, forward movement of the crawlers is automatically reduced, either to a slower speed or to a complete stop, thus overriding the manual input, once, for example, the ratio of the output speed of an internal combustion engine and the output speed of a torque converter that couples the engine to an excavating element exceeds a preset ratio. Certain engine and torque converter protection steps can also be automatically based at least in part on this ratio.

DESCRIPTION OF PREFERRED EMBODIMENTS

In the following description, like numbers refer to like parts.

Figure 3:
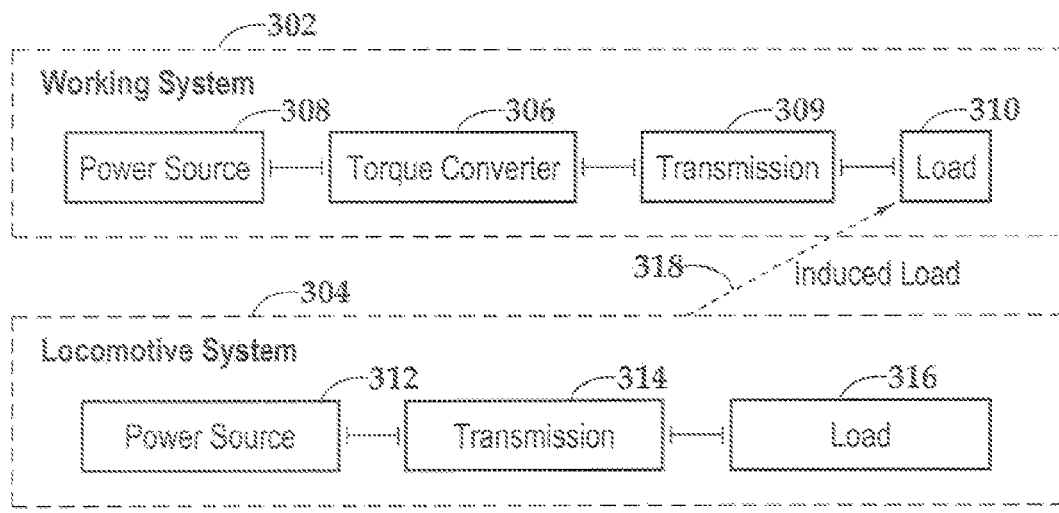
FIG. 3 is a schematic diagram of two power systems of a machine, one for moving the machine and the other for driving a working element.
Figure 4:
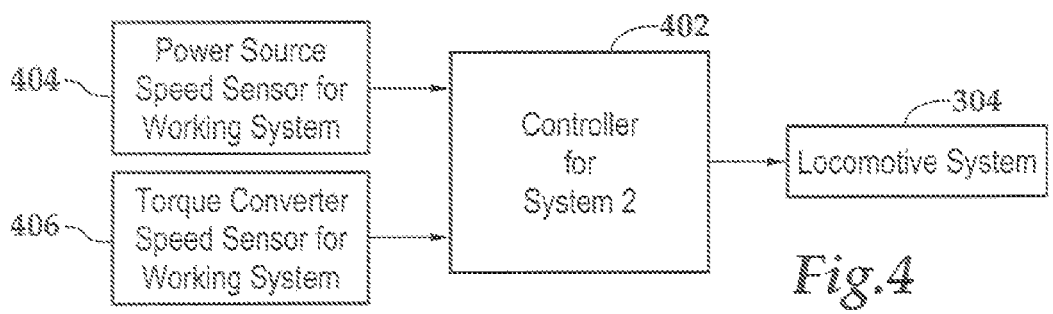
FIG. 4 is a flow diagram of a process for controlling the power system for moving the machine of FIG. 3 in response to a load on the power system for driving a working element.
Figure 5:
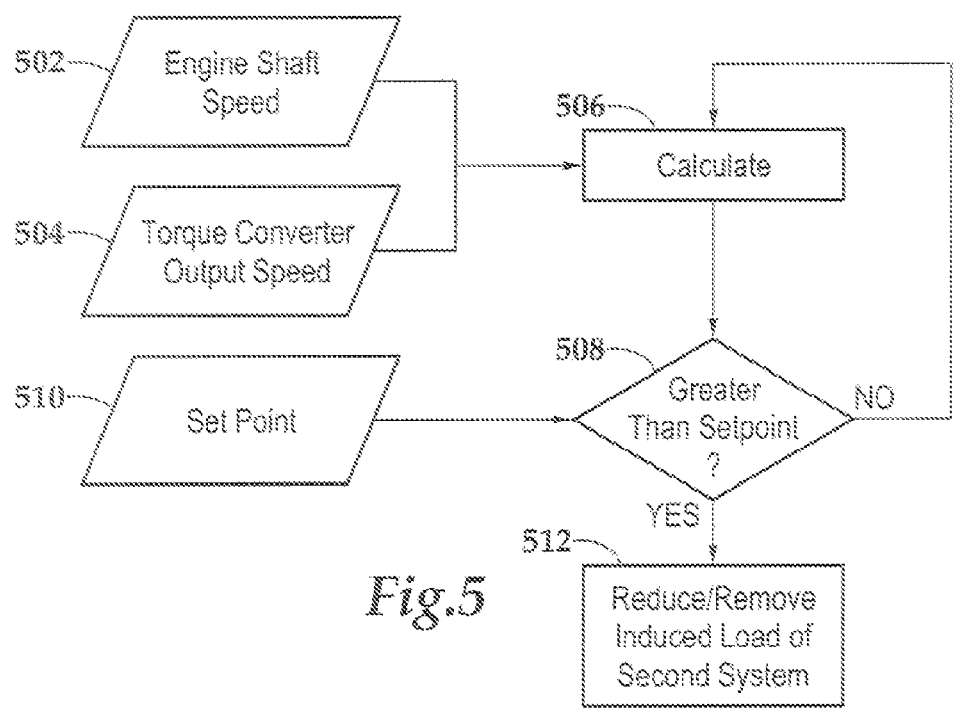
FIG. 5 is a schematic of a controller for the power system for moving the machine of FIG. 3.

Referring to FIGS. 3, 4 and 5, controller 402 controls at least in part operation of locomotive system 304 based at least in part on the speed of power source 308 and the output speed of torque converter 306, both of which are part of working system 302. The speed of the power source 308 is received from sensor 404. The speed of the output of the torque converter is received from sensor 406. The controller may receive additional inputs, such as manual inputs from an operator of the machine. As illustrated by FIG. 5, the controller receives the power source speed 502 and the torque converter output speed 504 at step 506, and calculates at least one feedback parameter based at least in part on these measurements. A feedback parameter may be proportional to a ratio of the two speeds, for example, or it may be a derivative or integral of the ratio. The controller continually evaluates whether the one or more parameters are acceptable. The evaluation may be based, for example, on whether a feedback parameter falls within range of acceptable values. In the illustrated example, a single feedback parameter that is a proportional ratio of the two speeds is used. At step 508, the controller evaluates whether the ratio is in a range of values that exceeds set point 510. If so, the load 310 on working system 302 is reduced at step 512 by removing or reducing the load induced on it by locomotive system 304, overriding any input or instructions from the operator of the machine. Stopping or slowing the locomotive system reduces or removes the induced load. In this example, the set point may be set by an operator, or calculated based on input received from the operator and/or other inputs.

A decision on whether to stop or slow the movement of the machine may alternatively be based on multiple feedback parameters calculated by the power source speed and torque converter speed, such as for example the ratio, a rate of change of the ratio, or its average value over a period of time. The decision could also take into account other parameters, such as for example speed of the machine and the working element.

Although not illustrated in FIG. 5, the controller preferably restores control of the machine to the machine operator when the feedback parameter values are acceptable. Typically, it is preferable to wait a predetermined period of time before evaluating whether the values are acceptable. Alternately or additionally, the parameter values may be evaluated using a range that is different from the range used when evaluating the feedback parameter at step 508. For example, the ratio may need to be a predetermined amount below the set point 510 before operator control is restored. Furthermore, it may also be preferable for the feedback parameter to be within the acceptable range for a predetermined amount of time before operator control is restored.

Figure 1:
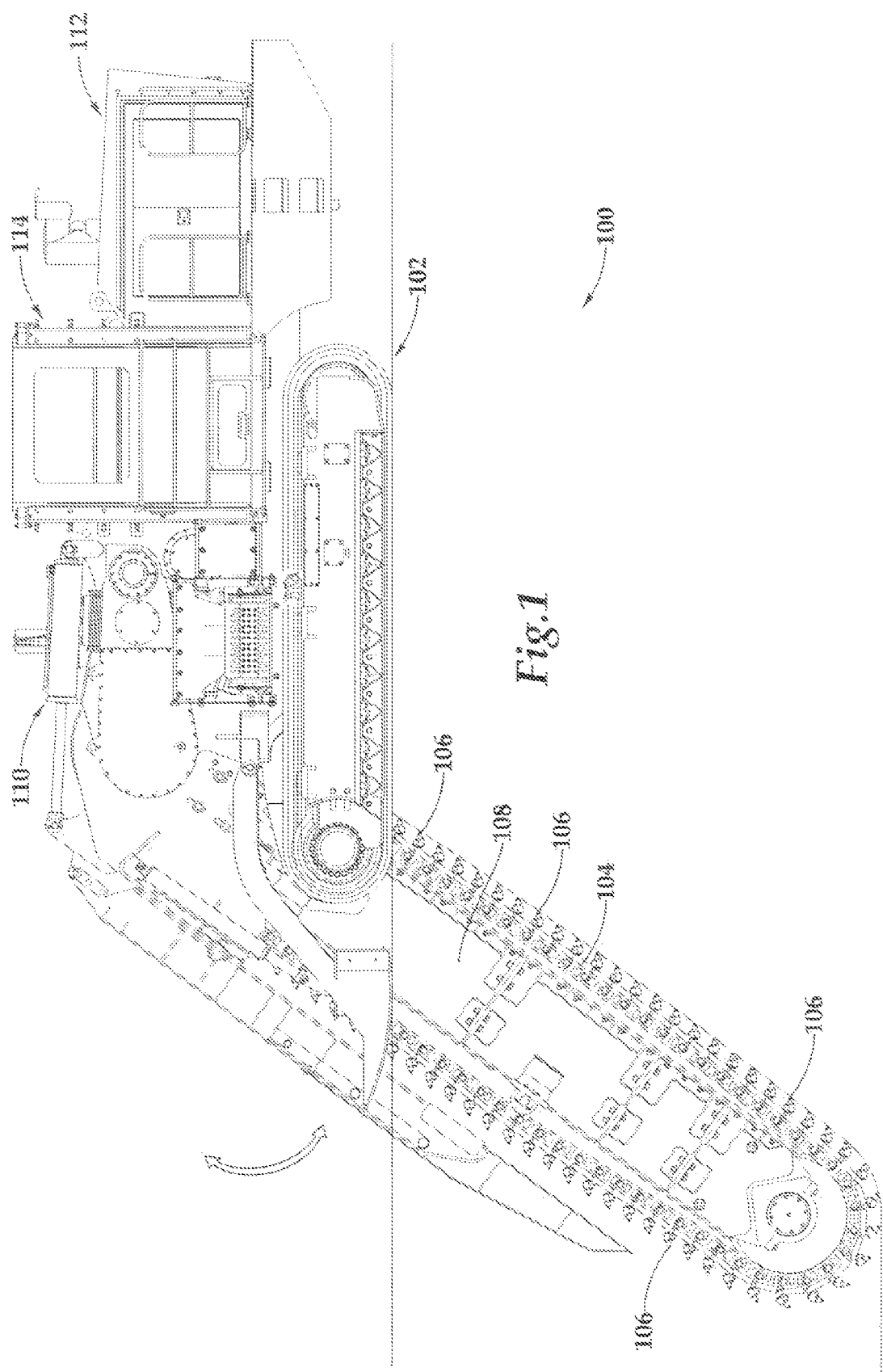
FIG. 1 is an elevational view of an example of a trencher.
Figure 2:
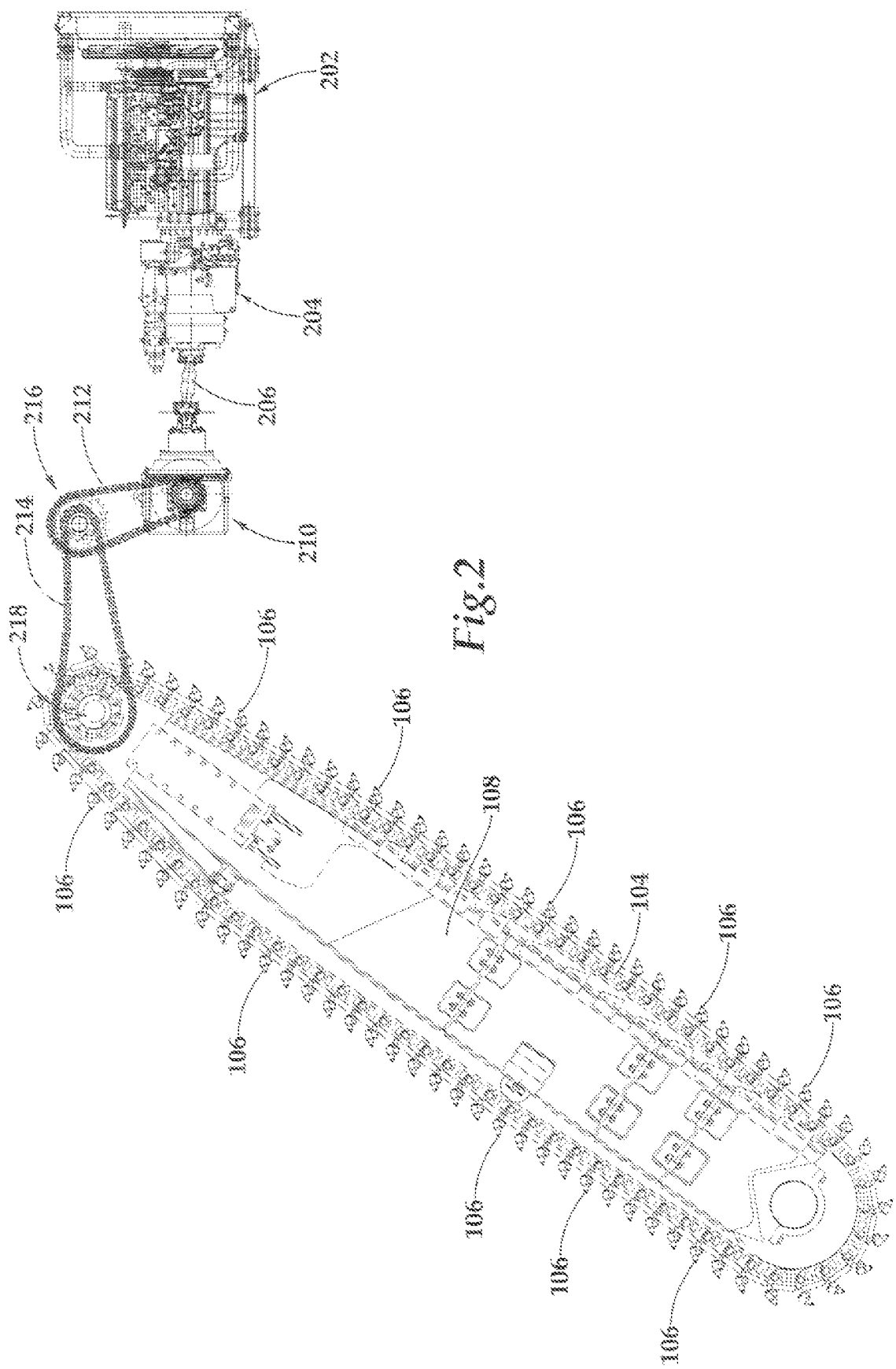
FIG. 2 is an elevational view of a power train for a cutting chain of the trencher in FIG. 1.
Figure 6:
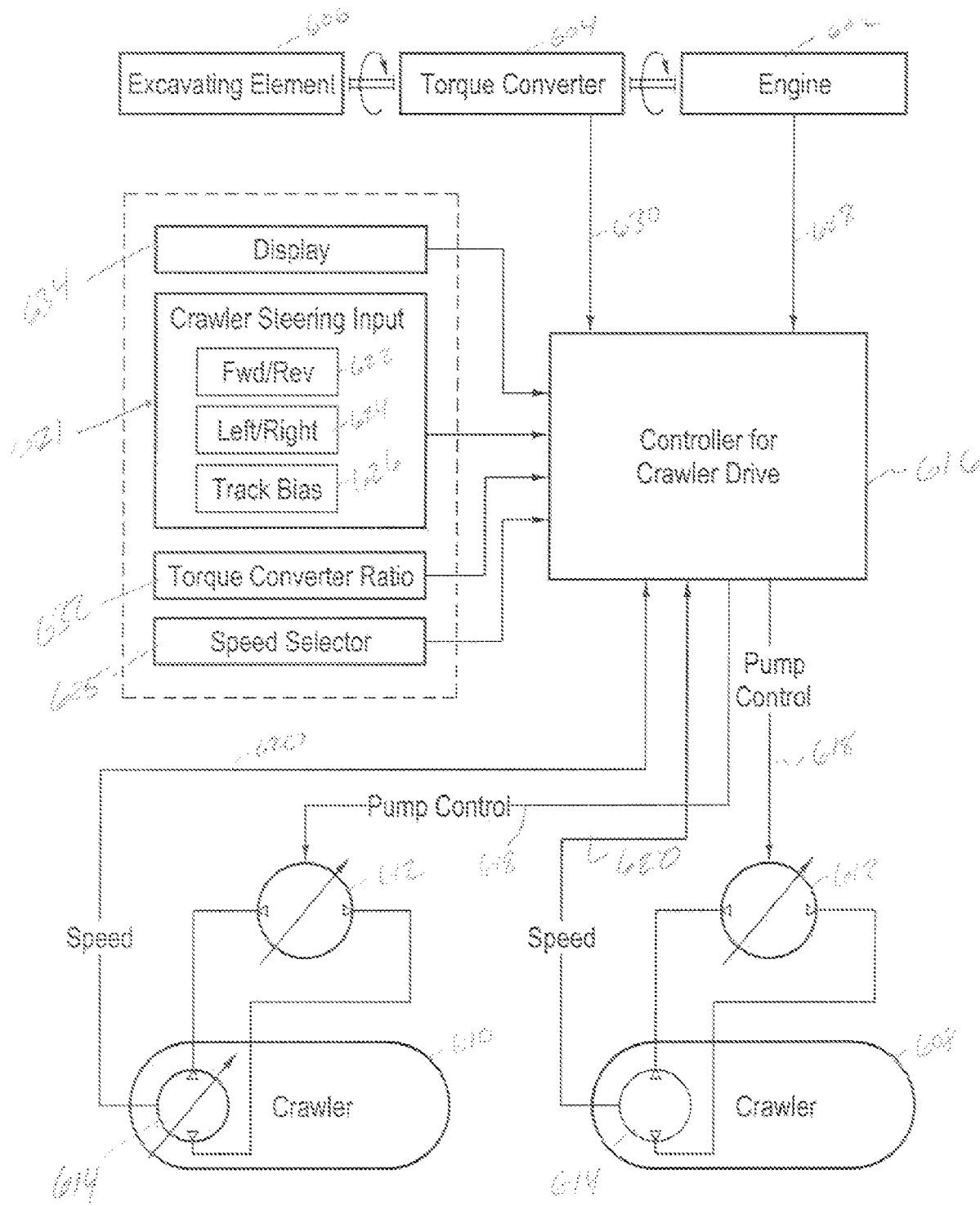
FIG. 6 is a schematic diagram of certain elements of a trencher.

FIG. 6 schematically illustrates an example of a power drive train for an excavating element, hydraulic system for crawlers, and crawler controller of a trencher of the general types described in FIGS. 1 and 2. The trencher has a first power source, in this case a diesel fueled internal combustion engine 602, that is coupled through torque converter 604 or similar fluid coupling to an excavating element 606. A transmission is omitted from the illustration. The trencher's crawler system is comprised of at least two crawlers 608 and 610. Each crawler is powered hydraulically by a pump 612 for pumping hydraulic fluid under high pressure to a hydraulic motor 614. Each motor turns the belt of the crawler.

Crawler controller 616 controls the operation each pump 612, as indicated by lines 618. Control includes signals for turning the pump on and off, and the direction of flow of the hydraulic fluid. It preferably also includes signals for setting displacement of the pump, and thus the rate of flow of the hydraulic fluid to the motor. The controller receives from each crawler a signal indicating or representing the speed of the crawlers, as represented by lines 620.

The trencher is steered by an on-board operator who provides steering inputs through several manually operated or actuated input mechanisms. These steering input mechanisms are generally represented by block 621. Mechanism 622 signals forward/reverse, such as a lever with three positions, one for forward, one for neutral and one for reverse. Mechanism 624 controls turning the trencher left or right, speed selector 627 allows the operator to select a speed for the crawlers. Mechanism 626 sets a track bias that fixes a speed differential between the two crawlers. The bias can be used, for example, to dig a trench along a curved line, at a fixed radius.

Unlike the trenchers of FIGS. 1 and 2, crawler controller also receives several additional inputs. It receives a signal indicating engine speed of engine 602, represented by line 628, and a signal indicating the speed of the output of torque converter 604, represented by line 630. It also receives an input 632 indicating a limit for a ratio of the engine speed to the torque converter. This ratio is, in this example, set or selected by an operator, preferably from a range of acceptable ratios. The crawler controller uses the measured ratio and the set ratio to determine whether to override operator input and stop or slow the crawlers so as to maintain a relatively constant deliver of power to the excavating element 606 from engine 602.

Figure 7:
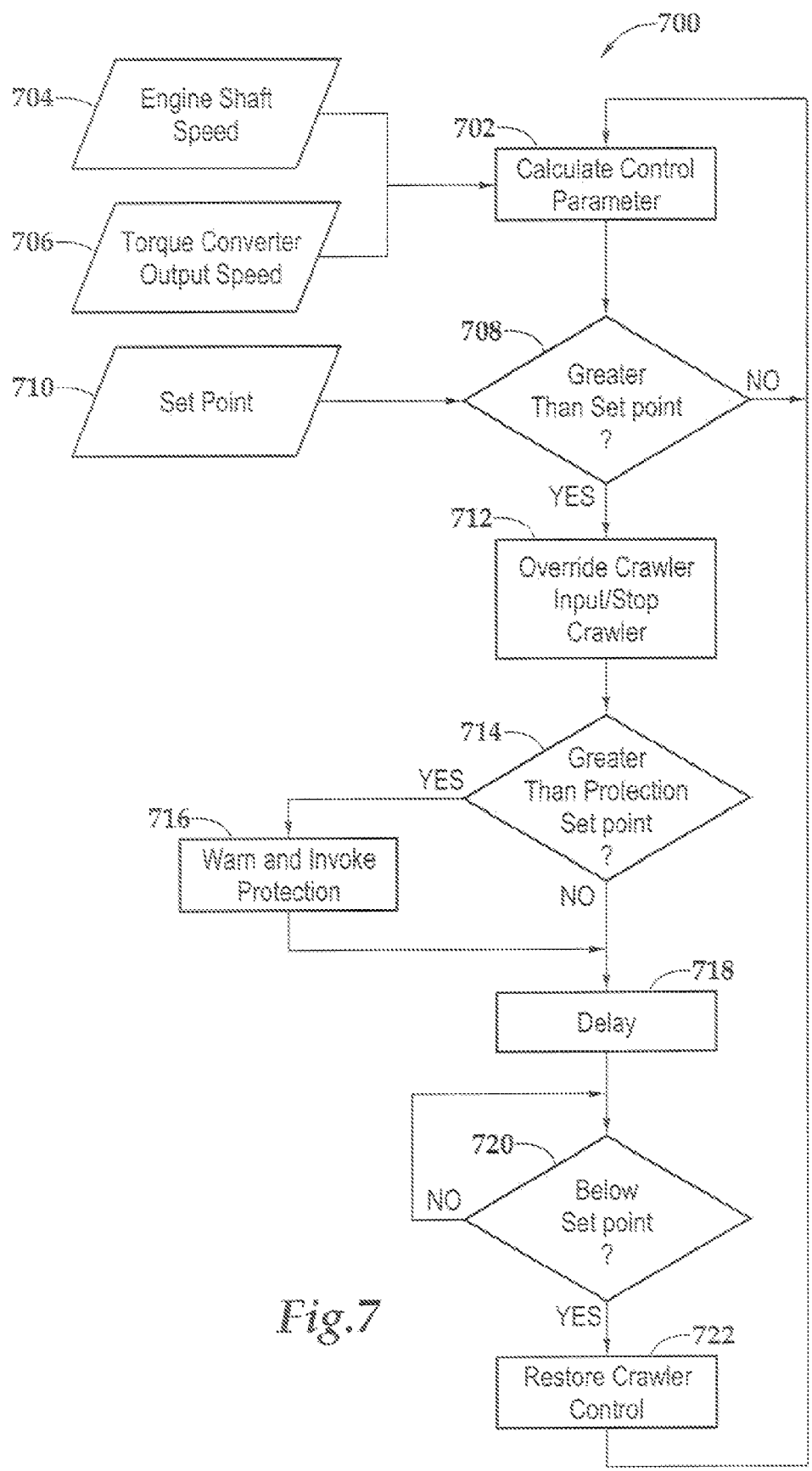
FIG. 7 is a flow diagram of a process for controlling a crawler of the trencher of FIG. 6 in response to a load on an excavating element.

Turning now also to FIG. 7, flow chart 700 illustrates the primary steps of an exemplary flow of processes within controller 616 for controlling operation of the crawlers based at least in part on the speed of engine 602 and the output speed of torque converter 604. The controller includes circuitry for carrying out these steps, preferably in the form of a programmed microcontroller or other nonprogrammable or programmable logic circuitry. At step 702 engine shaft speed input 704 and torque converter output speed 706 are used to calculate at least one control parameter. In this example, the control parameter is the ratio of the engine speed and the torque converter output speed. However, a different control feedback parameter, such as a time derivative or integral of this ratio, could be calculated in place of, or in addition to the ratio in order to, for example, filter or avoid problems associated with spurious or momentary changes in the ratio. At step 708, the one or more control parameters are evaluated against predetermined criteria to determine whether they are acceptable. In this example, the single input parameter, the ratio, is compared to a set point 710 to determine whether it is within an acceptable range. For example, the set point may be a ratio in the range of 1.0 to 2.3. If the calculated ratio is in the range of values below this set point, nothing happens. However, if it is in the range that exceeds this set point, the controller overrides the operator inputs and reduces the speed of the crawler to a full stop at step 712. Alternately, the controller causes slowing of the crawlers and then stopping the crawlers if slowing the crawlers does not reduce the ratio to an acceptable range.

The controller can, optionally, be programmed with drive train protection information. As represented by steps 714 and 716, if the control parameter is within the range indicating that the drive train needs protection, such as the ratio being above the drive train protection point for some predetermined period of time, drive train protection measures can be invoked. These measures may include reducing the allowable fuel burn of the engine, or opening a bypass or pressure reducing valve on the torque converter, or invoking a torque limiting variable in the engine software. Display 634 can be used to warn the operator if the ratio of engine speed to torque converter speed is getting close to a protection point, such as by a warning light, and when it exceeds it.

After a period of delay 718, the controller calculates the one or more control parameters to determine whether they are in an acceptable range, as indicated by decision step 720. In this example, once the ratio is below the set point for at least a predetermined period, the controller restores operator control at step 722.

The foregoing describes examples of the invention in its preferred form, and is not intended to limit the scope of the invention to the embodiments as set forth. Modifications, omissions, extensions, re-arrangements and other improvements or alterations to these embodiments can be made without departing from the scope of the invention as set out in the following claims.

What is claimed is:

1. A machine comprising:
    a locomotive system for moving the machine under input of an operator;
    a power system for driving a working element, the power system including a power source coupled with a working element through a torque converter, the torque converter having an output coupled with the working element for transmitting power from the power source to the working element; and
    a controller in communication with the power system, the controller including circuitry for overriding operator input and controlling the locomotive system to reduce the speed of movement of the machine in response to at least one control parameter not being within an acceptable range, the at least one control parameter calculated based at least in part on a speed of the power source and a speed of the output of the torque converter.

2. The machine of claim 1, wherein the controller further generates a signal for reducing power delivered to the torque converter output, overriding operator input, based at least in part on the speed of the power source and the speed of the output of the torque converter.

3. The machine of claim 2, wherein the signal for reducing power causes the power source to produce less power.

4. The machine of claim 1, wherein the signal for reducing power invokes a torque limiting setting on the power source.

5. The machine of claim 1, wherein the at least one control parameter is proportional to the ratio of the speed of the power source and the speed of the output shaft of the torque converter.

6. The machine of claim 1, wherein the locomotive system includes at least one crawler.

7. The machine of claim 1, wherein the working element includes an earth excavating element.

8. The machine of claim 1, wherein the machine is a trencher, the locomotive system includes a crawler and the working element includes an excavating element for forming trenches.

9. A trencher comprising:
    a crawler system for moving the machine under input of an operator;
    an excavating element for forming a trencher, the excavating element driven by a power source coupled to the excavating through torque converter and drive train, the torque converter having an output coupled with the drive train and an input coupled with the power source; and
    a controller in communication with the power system, the controller including circuitry for overriding operator input and controlling the locomotive system to reduce the speed of movement of the machine in response to at least one control parameter not being within an acceptable range, the at least one control parameter calculated based at least in part on a speed of the power source and a speed of the output of the torque converter.

10. The trencher of claim 9, wherein the controller further generates a signal for reducing power delivered to the torque converter output, overriding operator input, based at least in part on the speed of the power source and the speed of the output of the torque converter.

11. The trencher of claim 10, wherein the signal for reducing power causes the power source to produce less power.

12. The trencher of claim 10, wherein the signal for reducing power invokes a torque limiting setting on the power source.

13. The trencher of claim 9, wherein the at least one control parameter is proportional to the ratio of the speed of the power source and the speed of the output shaft of the torque converter.

* * * * *